United States Patent
Hodges et al.

(10) Patent No.: US 7,716,372 B2
(45) Date of Patent: May 11, 2010

(54) METHOD, SYSTEM AND STORAGE MEDIUM FOR PROVIDING SERVICES BASED ON USER PREFERENCES

(75) Inventors: Donna K. Hodges, Cumming, GA (US); Barrett Morris Kreiner, Norcross, GA (US)

(73) Assignee: AT&T Intellectual Property, I, L.P., Reno, NV (US)

(*) Notice: Subject to any disclaimer, the term of this patent is extended or adjusted under 35 U.S.C. 154(b) by 1674 days.

(21) Appl. No.: 10/610,976

(22) Filed: Jun. 30, 2003

(65) Prior Publication Data

US 2004/0267941 A1    Dec. 30, 2004

(51) Int. Cl.
*G06F 15/16* (2006.01)
(52) U.S. Cl. .................................... 709/246
(58) Field of Classification Search .............. 709/206, 709/207, 227, 230–233, 246
See application file for complete search history.

(56) References Cited

U.S. PATENT DOCUMENTS

| | | | | |
|---|---|---|---|---|
| 6,157,924 A | * | 12/2000 | Austin | 707/10 |
| 6,311,215 B1 | * | 10/2001 | Bakshi et al. | 709/221 |
| 6,654,814 B1 | * | 11/2003 | Britton et al. | 709/246 |
| 6,671,732 B1 | * | 12/2003 | Weiner | 709/231 |
| 6,704,024 B2 | * | 3/2004 | Robotham et al. | 345/581 |
| 6,880,014 B2 | * | 4/2005 | Brown et al. | 709/227 |
| 7,072,984 B1 | * | 7/2006 | Polonsky et al. | 709/246 |
| 7,114,007 B2 | * | 9/2006 | Sasaki | 709/246 |
| 2003/0023755 A1 | * | 1/2003 | Harris et al. | 709/246 |
| 2004/0158860 A1 | * | 8/2004 | Crow | 725/46 |

FOREIGN PATENT DOCUMENTS

WO    WO 0229603 A1 * 4/2002

OTHER PUBLICATIONS

U.S. Appl. No. 10/235,461, filed Sep. 4, 2002, Kreiner et al.

\* cited by examiner

*Primary Examiner*—Yemane Mesfin
(74) *Attorney, Agent, or Firm*—Cantor Colburn LLP

(57) ABSTRACT

An embodiment of the invention is a method for providing services to a user. The method includes receiving a request from a user for content and obtaining a user preference defining at least one of a modality preference, a paradigm preference and a service preference. Content is accessed including markup tags associating said content with the user preference. Processes identified with a process markup tag associating said processes with said user preference are executed and the order of processes is dependent on the user preference. Content having markup tags corresponding to the user preference is retrieved and provided to the user.

9 Claims, 5 Drawing Sheets

METHOD, SYSTEM AND STORAGE MEDIUM FOR PROVIDING SERVICES BASED ON USER PREFERENCES

BACKGROUND OF THE INVENTION

The invention generally relates to the field of computing. More particularly, the invention relates to systems and methods for coordinating communications between an application and various communication devices.

It is not uncommon today for people to use several communication devices. For example, a user may have a home computer, a work laptop, a wireless phone, and a personal digital assistant. Users typically utilize one of these communication devices at a time. For example, a user may send and receive e-mails via their personal digital assistant while commuting to work and then send and receive e-mails via their laptop once arriving at work. To use the personal digital assistant, the user typically begins a session with an e-mail application and the session continues until the user selects to end the session (e.g., at the end of the commute). Upon arriving at work, the user may begin another session between their work laptop and the e-mail application. Such session beginning and ending may be inconvenient for a user.

Each communication device typically has a different set of output capabilities. For example, a laptop computer typically is capable of displaying text and color graphics (e.g., color graphical images and color video). A personal digital assistant typically is capable of displaying text and a wireless telephone is typically capable of displaying a small amount of text and producing audible sounds. Therefore, an e-mail message including a video file may be best sent to a computer rather than being sent to a wireless telephone. Despite the differing output capabilities of the various types of communication devices, present systems and methods do not have the capability to coordinate where to send e-mails and other digital content items. This is typically because one communication device establishes a single session with one application. In such a case, communication is limited to communicating digital content items between that particular device and that particular application.

Moreover, because different types of communication devices may have different output capabilities, applications typically include a significant amount of programming to be able to properly display digital content items on different types of communication devices. For example, an application may include programming code to properly display digital content items on a computer, more programming code to properly display digital content items on a personal digital assistant, and even more programming to properly display digital content items on a wireless phone. Also, applications typically include programming code that queries a communication device to determine its output capabilities. For example, an application may query a browser of a computer to determine its output capabilities before sending a digital content item to the browser. Such programming code may make an application very complex to write and maintain.

Further, users may have a preference for specific types of content regardless of the communication device being used. For example, a user of a personal computer with a relatively slow network connection (e.g., 56 kbps) may desire to eliminate animations or graphics completely when retrieving information over a network (e.g., the Internet). Alternatively, a user of a color graphics enabled PDA may desire gray scale graphics to reduce processing burden on the device.

In view of the foregoing, there is a need for methods and systems for coordinating communication between several types of communication devices and user preferences.

SUMMARY OF THE INVENTION

An embodiment of the invention is a method for providing services to a user. The method includes receiving a request from a user for content and obtaining a user preference defining at least one of a modality preference, a paradigm preference and a service preference. Content is accessed including markup tags associating said content with the user preference. Processes identified with a process markup tag associating said processes with said user preference are executed and the order of processes is dependent on the user preference. Content having markup tags corresponding to the user preference is retrieved and provided to the user.

BRIEF DESCRIPTION OF THE DRAWINGS

Referring to the exemplary drawings wherein like elements are numbered alike in the accompanying Figures.

DETAILED DESCRIPTION

Figure 1:
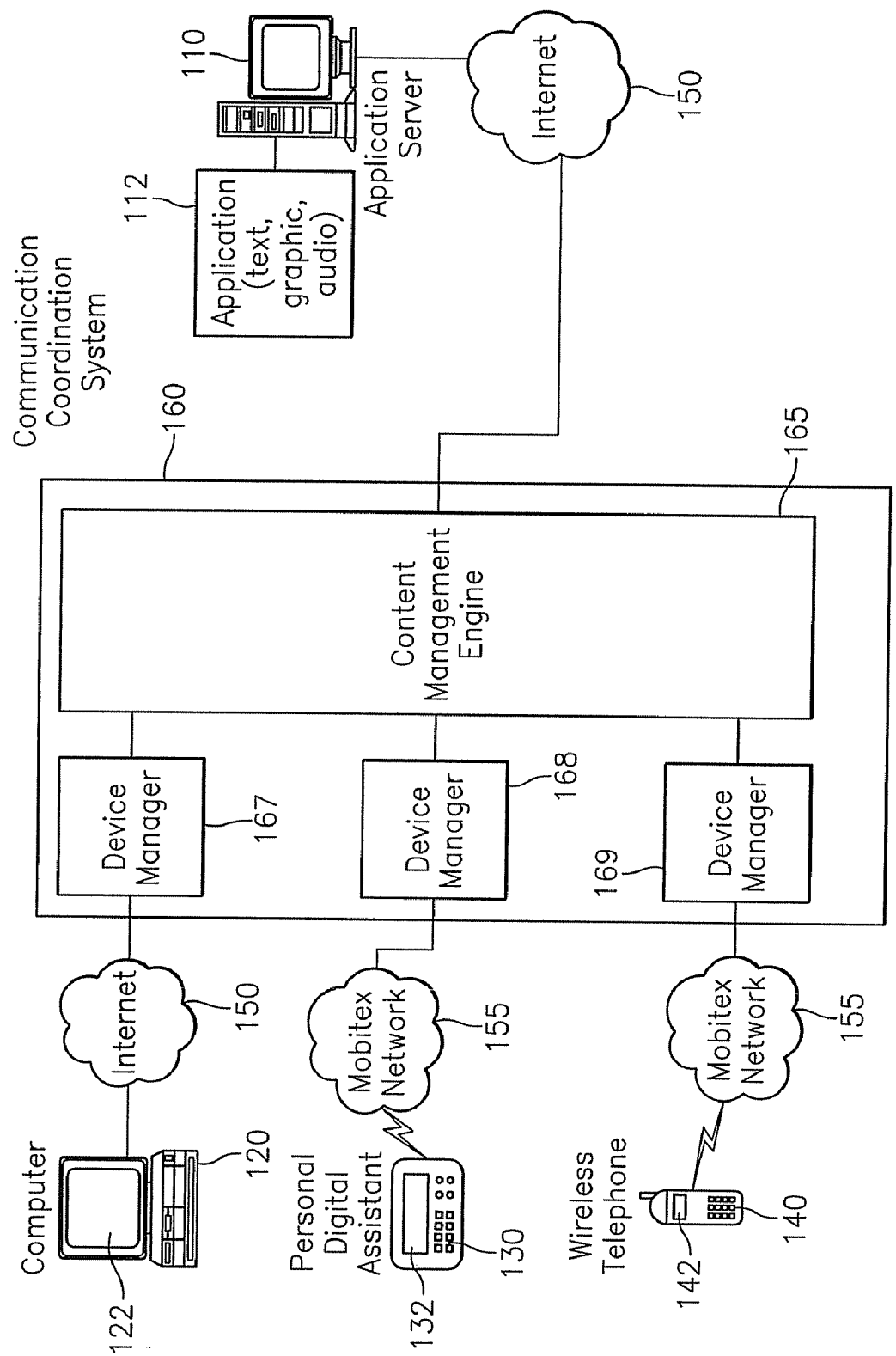
FIG. 1 is a diagram of an exemplary network environment providing communication with a number of communication devices.

FIG. 1 shows an exemplary network environment in which management of device communication may be implemented. As shown in FIG. 1, application server 110 is in communication with computer 120 via communication network 150. Application server 110 may be any server executing an application that sends digital content items to a communication device. For example, application server 110 may be a web server, an e-mail server, and the like. While communication network 150 is shown as the Internet 150, communication network 150 may be any communication network including a local area network (LAN), wide area network (WAN), intranet, extranet, and the like.

Application server 110 is also in communication with personal digital assistant 130 via communication network 150 and communication network 155. While communication network 155 is shown as a Mobitex network 155, communication network 155 may be any wireless communication network. Application server 110 is further in communication with wireless telephone 140 via communication network 150 and communication network 155.

Computer 120, personal digital assistant 130, and wireless telephone 140 are communication devices that a user may utilize to communicate with application server 110. While a user may utilize any number of communication devices, three communication devices are shown here for illustrative purposes. Communication devices may also include a laptop computer, a wireless pager, a wireless text messaging device, a wireless e-mail device, or any other communication device.

Computer 120 may be any computer (such as, for example, a desktop, a laptop, and the like) that can communicate over a network. As shown, computer 120 may communicate over the Internet 150; however, computer 120 may communicate over any network, such as, for example, a local area network (LAN), a wide area network (WAN), an intranet, and the like. Computer 120 typically executes a browser to communicate with the Internet 150 and to display digital content items received from the Internet 150. The browser may comprise any of several commercially available software browsers including, for example, Microsoft® Internet Explorer browser and Netscape® Navigator browser. Such browsers are typically configured to communicate via HTTP and to display digital content items based on Hypertext Markup Language (HTML).

HTML is a set of markup symbols or tags inserted in a file intended for display on a browser page. The tags tell the browser how to display a digital content item. Some tags come in pairs that indicate where in a document a particular display format or style is to begin and end. HTML is a formal recommendation by the World Wide Web Consortium (W3C) and is generally adhered to by the major browsers, such as, for example, Microsoft's® Internet Explorer browser and Netscape's® Navigator browser.

Browsers typically are also capable of displaying digital content items based on Extensible Markup Language (XML). XML is also a formal recommendation from the W3C and is similar to HTML. Both XML and HTML contain markup symbols or tags to describe the contents of a page or file. HTML, however, describes the content of a Web page in terms of how it is to be displayed. For example, the letter "p" placed within markup tags starts a new paragraph. XML describes the content in terms of what is being described. For example, the word "phonenum" placed within markup tags could indicate that the digital content item that followed was a phone number. This means that an XML file can be processed by a program based on the tags or can be displayed like an HTML file. XML is "extensible" because, unlike HTML, the markup symbols are unlimited and self-defining.

Because XML tags are self-defining, the tags may be used indicate a document type definition (DTD) which is a specific definition that follows the rules of the Standard Generalized Markup Language (SGML). A DTD is a specification that accompanies a digital content item and identifies how a particular digital content item is to be processed. By including a DTD with a digital content item, a browser or other device that includes a DTD "reader" will be able to process the digital content item and display or print it as intended.

Returning now to FIG. 1, computer 120 includes a user interface 122. In the illustrative example, user interface 122 has the capability to display text formatted with colors and style, color graphics, color video, and to produce audio sounds. While computer 120 has a versatile user interface; it may not be readily portable. Therefore, a user often relies on other communication devices, especially when traveling or commuting. For example, a user may utilize personal digital assistant 130, which may be any device that can communicate wirelessly such as a personal digital assistant commercially available from Palm Inc., Santa Clara, Calif. As shown, personal digital assistant 130 may communicate over a wireless Mobitex network; however, personal digital assistant 130 may communicate over any wireless network. Mobitex is a wireless network architecture that specifies a framework for fixed equipment to support wireless terminals in a packet-switched, radio-based communication system. Three major components of a Mobitex network are a radio base station, a switch, and a network management center (each not shown).

Personal digital assistant 130 includes a user interface 132. While various user interfaces are commercially available for a personal digital assistant, for illustrative purposes, user interface 132 has a limited output capacity, such as, for example, the capability to display one-hundred characters of text and to display grayscale graphics.

A user may also utilize wireless telephone 140, which may be any device that can communicate wirelessly such as a wireless telephone commercially available from Cingular Wireless, Atlanta, Ga. As shown, wireless telephone 140 may communicate over a wireless Mobitex network.

Wireless telephone 140 includes a user interface 142. While various user interfaces are commercially available for wireless telephones, for illustrative purposes, user interface 142 has a limited output capacity, such as, for example, the capability to display twenty characters of text and to produce audio sounds from audio signals.

A user may utilize any of user communication devices 120, 130, 140 to access application server 110. Application server 110 includes application 112. Application 112 may cause text, graphics, and audio digital content items to be sent to one or more user communication devices 120, 130, 140. Each communication device, however, may have a different output capability. For example, each of devices 120, 130, and 140 may have only one or more of the following output capabilities: a capability to display plain text; a capability to display text with style applied; a capability to display grayscale graphic images; a capability to display color graphic images; a capability to display video images; and a capability to produce audio sounds. Therefore, a particular communication device may not be able to display a particular digital content item. For example, wireless telephone 140 may not have the output capability to display a graphic.

Additionally, the user may desire the content in a specified format depending on user preference. For example, a user of wireless telephone 140 may request a weather report in audible format even though the wireless telephone 140 includes a text display. This allows users to establish personal preferences for content, while maintaining content appropriate for the output capabilities of the communication device.

In addition to there being different types of digital content items, each digital content item may be stored and transmitted in a variety of formats. For example, a graphic may be in a Joint Photographic Experts Group (JPEG) format, a bitmap format, a grayscale graphic format, and the like. A JPEG file is a graphic image file created by choosing from a plurality of compression algorithms. JPEG is one of the graphic file formats supported on the World Wide Web, usually with the file suffix of ".jpg". Also, audio may be in MPEG-I Audio Layer-3 (MP3) format, wave format, and the like. MP3 is a standard technology and format for compressing a sound sequence into a file while preserving the original level of sound quality when it is played. MP3 files are identified with the file name suffix of ".mp3."

A particular communication device 120, 130, 140 may not be able to process a particular format. To overcome this problem, application 112 may also send indications signifying the format of the digital content item. Content management engine 165 may use this format indication to further refine the communication devices capable of properly outputting the digital content item.

To get a digital content item to an appropriate communication device, communication coordination system 160 retrieves digital content from application server 110. Communication coordination device 160 selects which of several communication devices to the send the digital content item to and forwards the digital content item to the selected communication device. Content management engine 165 also applies user preferences to retrieve content in a format as requested by the user. Application server 110 may communicate with communication coordination system 160 via the Internet 150, as shown. Alternatively, application server 110 may communicate with communication coordination system 160 over a LAN, a WAN, and the like.

Communication coordination system 160 comprises a content management engine 165 and a device manager 167, 168, 169 for each user communication device 120, 130, 140. Device managers 167, 168, 169 communicate with the communication devices 120, 130, and 140 and may also determine the operational status and the output capabilities of the communication devices. Content management engine 165 may use the operational status and output capabilities determined by the device managers 167, 168, and 169 in combination with digital content item type and format information received from application server 110 to select a communication device to send a particular digital content item, as described in more detail below.

Device manager 167 communicates with computer 120 via the Internet 150; however, device manager 167 may communicate with computer 120 via a LAN, WAN, intranet, and the like. Device manager 167 also communicates with device coordination engine 165, which in turn communicates with application 112.

Device manager 168 communicates with personal digital assistant 130 via Mobitex network 155; however, device manager 168 may communicate with personal digital assistant 130 via other wireless networks. Device manager 168 also communicates with device coordination engine 165, which in turn communicates with application 112.

Device manager 169 communicates with wireless telephone 140 via Mobitex network 155; however, device manager 169 may communicate with wireless telephone 140 via other wireless networks. Device manager 169 also communicates with device coordination engine 165, which in turn communicates with application 112. While a separate device manager is shown for each type of user communication device 120, 130, 140, a single device manager may communicate with more than one type of communication device. For example, one device manager may communication with both personal digital assistant 130 and wireless telephone 140.

Content management engine 165 is interposed between user communication devices 120, 130, 140 and application 112. Content management engine 165 provides the capability to direct one type of digital content item to a first user communication device and a second type of digital content item to a second user communication device, as described in more detail below.

Figure 2:
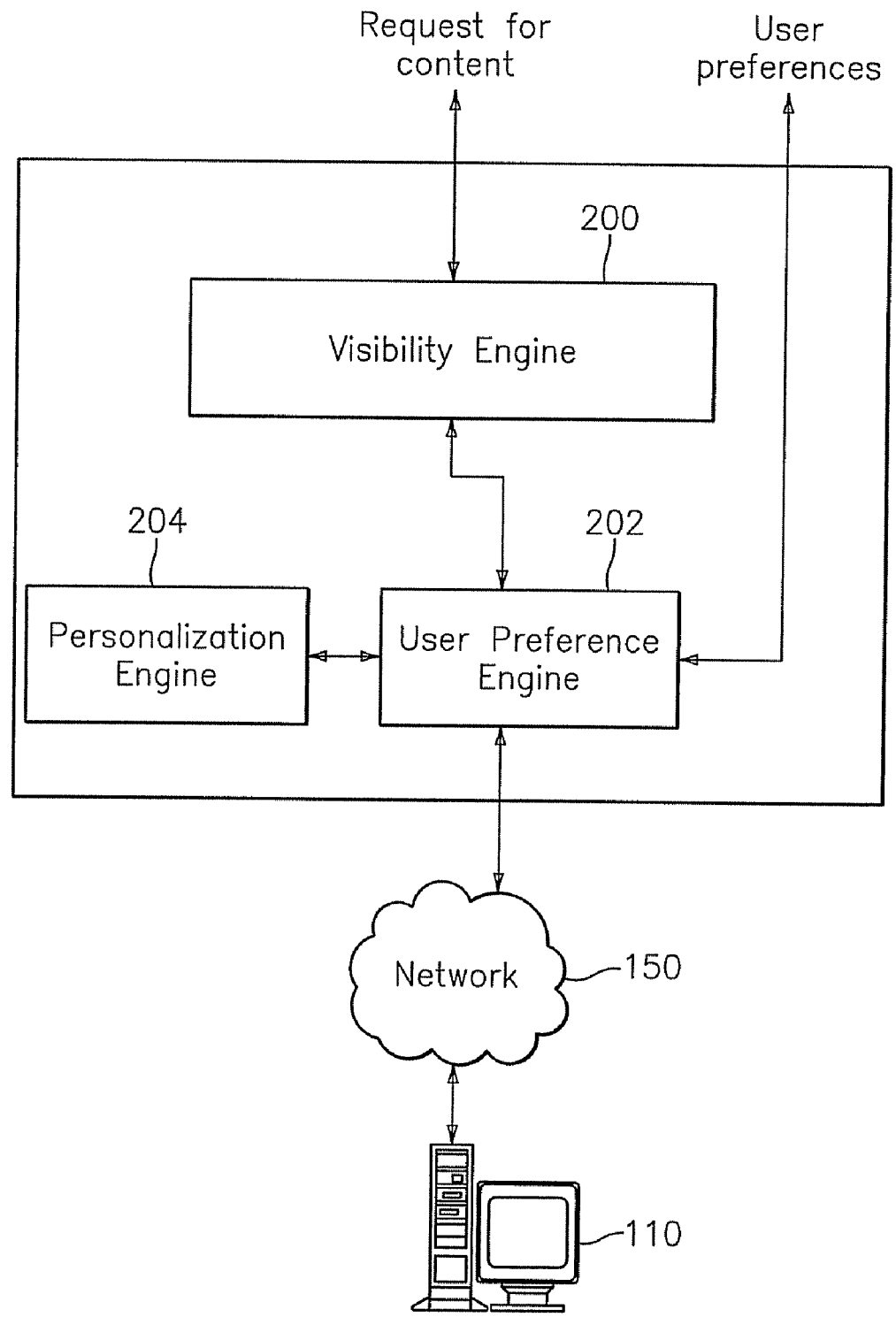
FIG. 2 is a block diagram of a content management engine.

FIG. 2 is a block diagram of the content management engine 165. The content management engine 165 is responsible for delivering content in a format compatible with the user's communication device, in accordance with user preferences and using processes defined by user preferences. To provide these functions, the content management engine 165 includes a visibility engine 200 that operates to detect the type of communication device requesting content and place constraints on the types of content retrieved from application 112. The visibility engine 200 may be implemented as described in co-pending U.S. patent application Ser. No. 10/235,461, the entire contents of which are incorporated herein by reference. The visibility engine 200 ensures that retrieved content is compatible with the communication device requesting the content.

The user preference engine 202 enables content to be retrieved based on user designated preferences. The content is also processed by the visibility engine 200 to confirm that the content is compatible with the communication device. The user preference engine 202 obtains content based on one or more user preferences. As described in further detail herein, the user preferences may be received along with the request for content. Alternatively, the user preferences may be retrieved from a personalization engine 204 storing user preferences.

Figure 3:
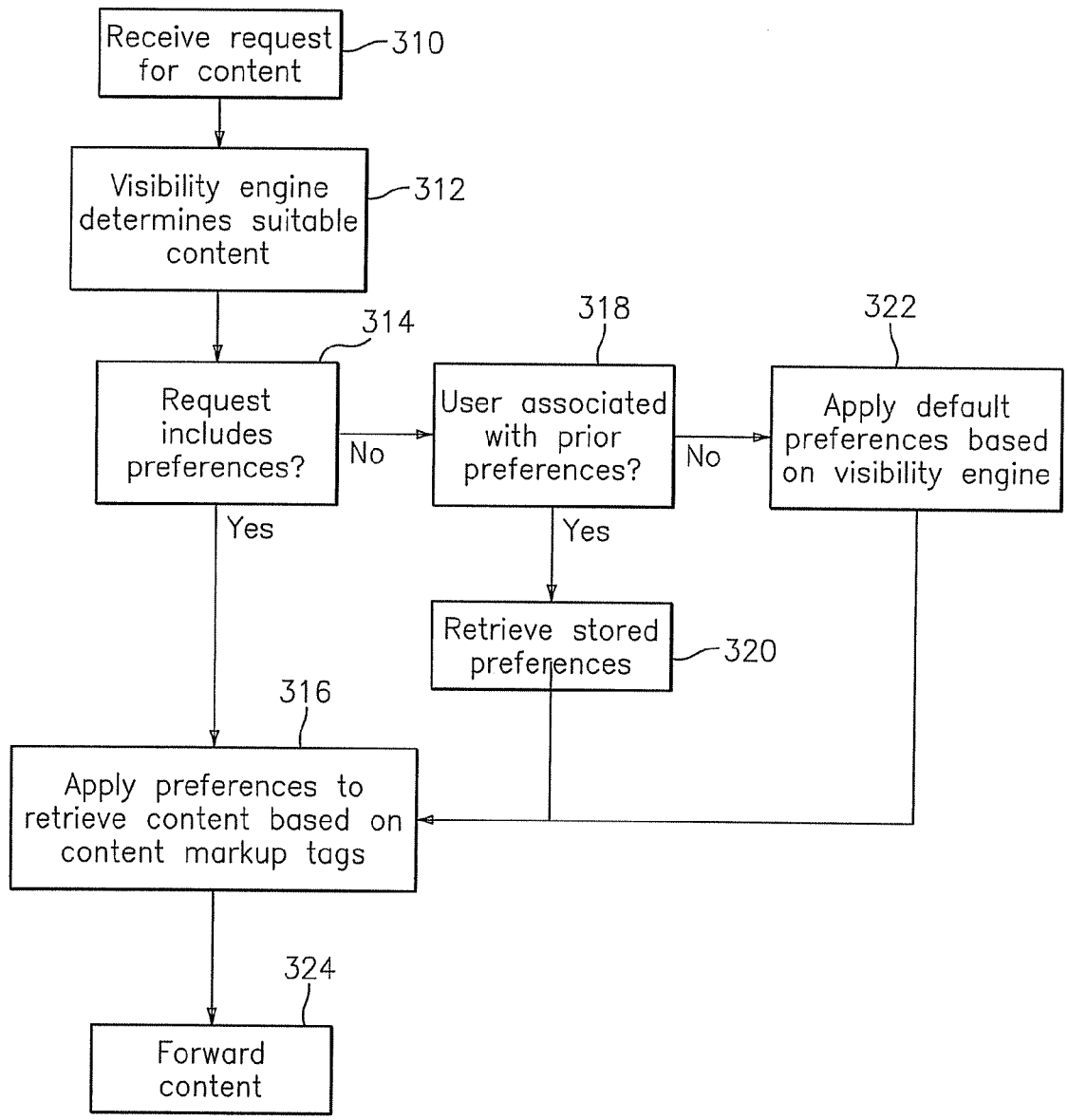
FIG. 3 is a flowchart of a process for retrieving content.

FIG. 3 is flowchart of a process of providing content to a user based on user preferences implemented by the user preference engine. The process begins at step 310 where a request for content is received at the content management engine 165 from a communication device. At step 312, the visibility engine 200 determines the types of content that are compatible with the communication device requesting content. These types of content may be further reduced based on user preferences.

At step 314, the user preference engine 202 determines if the request for content includes any user preferences. As described above, a user may specify audio only even if the communication device can process text. The preferences may be made through suitable user interfaces on the communication devices. Known user interface techniques may be used to allow a user to designated preferences such as buttons, drop down menus, etc. If the request is accompanied by user preferences, flow proceeds to step 316 where the user preference engine 202 retrieves content from application server 110. The retrieval of content in conformance with the user preferences is described in further detail herein.

If at step 314 it is determined that the request does not include user preferences, the flow proceeds to step 318 where it is determined whether the user is associated with stored preferences. The user preference engine 202 accesses the personalization engine to locate stored preferences associated with the user. User preferences submitted in a prior request may be used to establish stored preferences in the personalization engine 204. The user may be identified using known techniques such as login ID, cookies, phone number of wireless telephone, etc. If user preferences are stored in personalization engine 204, the user preferences are retrieved at step 320 and used to retrieve content at step 316.

If no user preferences accompany the request and no stored user preferences exist, then flow proceeds to step 322 where default user preferences are determined based on the communication device identified by the visibility engine. For example, if the visibility engine determines that the request is provided from a wireless phone, the default preferences are set based on this communication device. Content is then retrieved at step 316.

The retrieved content is provided to the user at step 324. The user preferences are used to control the type of content provided to the communication device and the processes executed by the application server 100. The visibility engine 200 ensures that the content is compatible with output capabilities of the communication device.

User preferences and retrieval of content based on user preferences will now be described. Although user preferences may be defined in a variety of manners, an embodiment of the invention characterizes user preferences as modality preferences, paradigm preferences and service preferences.

The user may define a modality preference which indicates the type of output the user wants to receive. Exemplary modalities include graphics, text, audio, animation, holograms, video, etc. The user may define a modality preference by designating one or more output formats to be received on the communication device. This modality preference allows the user to receive content in a user-defined format regardless of what formats the visibility engine 200 indicates are proper.

Another user preference is a paradigm preference. The paradigm preference establishes the nature of the interaction desired between the user and the content. For example, the user may want transactional functionality (e.g., the ability to purchase goods or services, make reservations, etc.) or navigational functionality (e.g., the ability to view content). Other examples of paradigm preferences include a preference for hearing impaired content.

Another user preference is a service preference. The service preference indicates what types of services the user requests. Exemplary services include e-mail, voice mail, paging and web access. The user may submit a service preference requesting one or all of these services. If no service preference is submitted, the default may be providing all services to the user.

Once the user preferences are established, the user preference engine 202 accesses content from the application server 110 based on the user preferences. The application 112 is coded using a markup language as shown in the example in FIG. 4. The markup language includes tags similar to metatags used in HTML.

Figure 4:
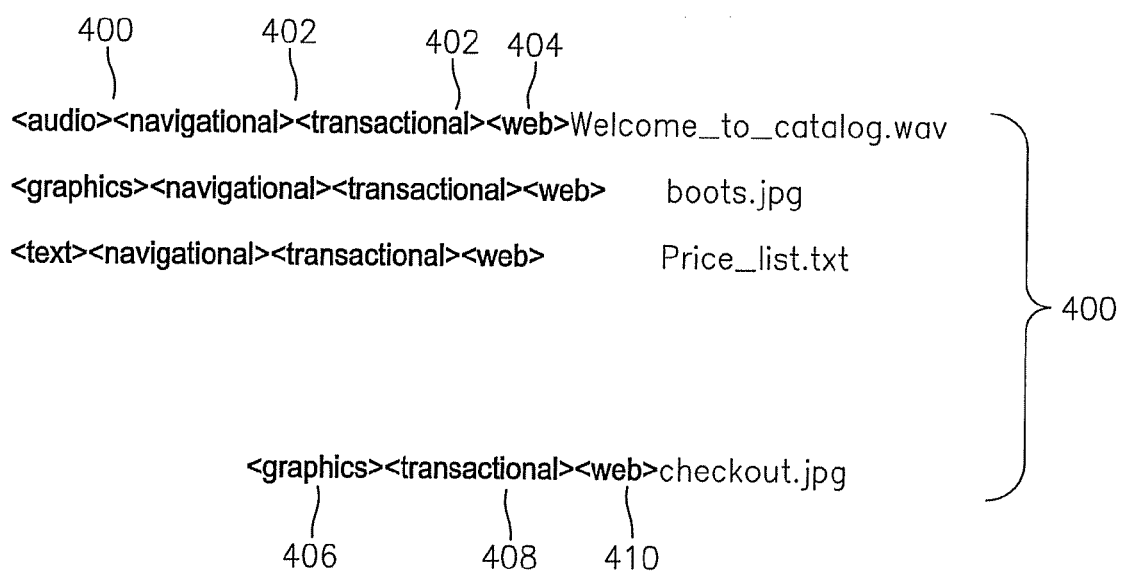
FIG. 4 illustrates content including markup tags.

As shown in FIG. 4, the content 400 may include a variety of items including audio files (.wav), graphics files (.jpg), text files (.txt), etc. The application 112 also includes markup language having a number of markup tags that identify the content and relate the content to user preferences. For example, in FIG. 4, a modality markup tag 401 identifies the content as graphics and paradigm markup tags 402 indicates that the content is utilized in navigational paradigm preferences and transactional paradigm preferences. Service markup tag 404 indicates that the content is relevant to web access services. Modality markup tag 406 identifies the content as graphics, paradigm markup tag 408 identifies the content relevant to transactional paradigm preferences and service markup tag 410 indicates that the content is relevant to web access services.

Figure 5:
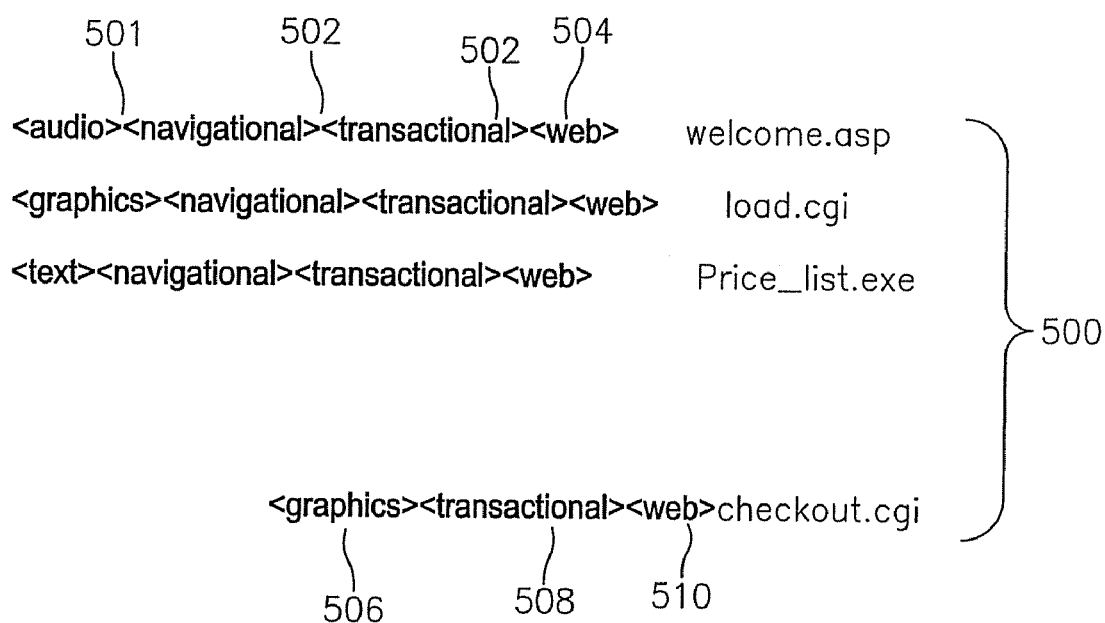
FIG. 5 illustrates processes including process markup tags.

In addition to associating content with markup tags, processes executed by application server are associated with process markup tags. As shown in FIG. 5, the processes 500 available to be implemented by application 112 may include a variety of routines such as cgi scripts, asp applications, java scripts, enterprise java beans (EJB), etc. The application 112 also includes a process markup language having a number of process markup tags that identify the processes and relate the processes to user preferences. For example, in FIG. 5, a modality process markup tag 501 identifies a process as relating to graphics and paradigm process markup tags 502 indicate that the process is utilized in navigational paradigm preferences and transactional paradigm preferences. Service process markup tag 504 indicates that the process is relevant to web access services. Modality process markup tag 506 identifies the process as relating to graphics, paradigm process markup tag 508 identifies the process as relevant to transactional paradigm preferences and service process markup tag 510 indicates that the process is relevant to web access services. The process markup tags may also designate default processes that must be performed for each session, regardless of user preferences.

The process markup tags control which processes are executed based on user preferences. For example, if an experienced user wants only transactional processing in a text format, then the appropriate processes are executed in the appropriate order to provide this functionality. Software routines relevant to audio and graphics generation would not be executed in this example. Thus, not only is the content tailored to user preferences, but the processes executed are also customized based on user preferences.

By including content markup tags and process markup tags in application 112, the user preference engine 202 can retrieve content that meets the user preferences and execute only the application processes needed by the user. The processes to be executed and the order of the processes to be executed is dictated by user preferences and process markup tags. This allows a single application 112 to be coded to serve multiple users with multiple communication devices and user preferences. This is particularly helpful when the user changes modalities (e.g., from PC to cell phone) requiring different content and different processes to be executed.

The process markup tags in application 112 may also dictate which processes, and the order of the processes, to be executed based on input capabilities of the user's communication device. For example, if the input device is capable of decompression, then a content compression routine is executed by application 112 because the communication device is capable of decompressing this content. If a communication device cannot buffer content, then the application 112 executes routines to buffer content appropriately. The input capabilities of the user communication device may be defined by one or more of the user preferences.

The process markup tags in application 112 may also dictate which processes, and the order of the processes, to be executed when a user communication device becomes disconnected or is intermittently disconnected from the communication network (e.g., Internet 150 or wireless network 155). For example, default processes may require that content be forwarded by e-mail when the user is disconnected or that the application 112 pause delivering content until the user becomes connected. The user preference may define the desired processing and the application include process markup tags identifying the appropriate processes and the appropriate ordering of processes.

As described above, the present invention can be embodied in the form of computer-implemented processes and apparatuses for practicing those processes. In an exemplary embodiment, the invention is embodied in computer program code executed by the content management engine. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing services to a user, the method comprising:

receiving at a communication coordination system a request from a user for content;

at a content management engine, obtaining a user preference defining a modality preference indicating a type of output the user wants to receive, the type of output including one of graphics, text, audio, animation, holograms and video, a paradigm preference indicating user-desired functionality to be associated with the content, the functionality including transactional functionality including the ability to purchase goods or services and navigational functionality including the ability to view content, the paradigm preference including a preference for hearing impaired content, and a service preference indicating types of services the user requests including one of e-mail, voice mail, paging and web access;

wherein obtaining the user preference is performed by determining if the request includes the user preference and using the user preference that accompanied the request;

if the request does not include the user preference, then determining if the user is associated with stored preferences and using the stored preferences as the user preference; and if the request does not include the user preference and the user is not associated with stored preferences, then using default preferences based on a visibility engine as the user preference;

accessing content including markup tags associating said content with said user preference, said markup tags including a paradigm markup tag identifying said content as being with or without transactional functionality;

retrieving content having markup tags corresponding to said user preference;

executing processes identified with a process markup tag associating said processes with said user preference, an order of said processes being dependent on said user preferences;

providing said retrieved content to said user.

2. The method of claim 1 wherein:
   said modality preference indicates a format for said content, said markup tags including a modality markup tag associating said content with at least one modality.

3. The method of claim 2 wherein:
   said modality preference includes text, graphics, audio and video.

4. The method of claim 1 wherein:
   said service preference indicates a service requested by the user, said markup tags including a service markup tag associating said content with at least one service.

5. The method of claim 4 wherein:
   said service preference includes e-mail, voice mail and web access.

6. The method of claim 1 wherein:
   said user preference is received with said request for content.

7. The method of claim 1 wherein:
   said user preference is retrieved from stored preferences for said user.

8. The method of claim 1 wherein:
   said executing a process includes executing a plurality of processes, a number and order of said processes being determined in response to said user preference.

9. The method of claim 1 wherein:
   said process markup tag identifies a default process that must be executed regardless of said user preference.

* * * * *